US008331858B2

(12) United States Patent
Nishiyama (10) Patent No.: US 8,331,858 B2
(45) Date of Patent: *Dec. 11, 2012

(54) COMMUNICATION APPARATUS, COMMUNICATION SYSTEM, COMMUNICATION METHOD AND PROGRAM

(75) Inventor: Fumihiro Nishiyama, Saitama (JP)

(73) Assignee: Sony Corporation, Tokyo (JP)

( * ) Notice: Subject to any disclaimer, the term of this patent is extended or adjusted under 35 U.S.C. 154(b) by 549 days.

This patent is subject to a terminal disclaimer.

(21) Appl. No.: 12/505,786

(22) Filed: Jul. 20, 2009

(65) Prior Publication Data

US 2010/0048126 A1 Feb. 25, 2010

(30) Foreign Application Priority Data

Aug. 25, 2008 (JP) ................................ 2008-215842

(51) Int. Cl.
*H04B 5/00* (2006.01)

(52) U.S. Cl. ...................................... 455/41.1; 455/574

(58) Field of Classification Search ................. 455/41.1, 455/41.2, 41.3, 574, 343.1, 343.2; 370/310, 370/346

See application file for complete search history.

(56) References Cited

U.S. PATENT DOCUMENTS

| 5,095,494 A * | 3/1992 | Takahashi et al. ............ 375/224 |
| 2006/0159158 A1 | 7/2006 | Moore et al. |
| 2007/0135078 A1* | 6/2007 | Ljung ......................... 455/343.1 |
| 2007/0147332 A1 | 6/2007 | Lappetelainen et al. |

FOREIGN PATENT DOCUMENTS

| EP | 1 898 530 A2 | 3/2008 |
| JP | 2002-64501 | 2/2002 |
| JP | 2004-164566 | 6/2004 |
| JP | 2008-526066 | 7/2006 |
| JP | 2008-99236 | 4/2008 |
| WO | WO 2006/067528 A2 | 6/2006 |
| WO | WO 2008/094017 A2 | 8/2008 |
| WO | WO 2008/094017 A3 | 8/2008 |

OTHER PUBLICATIONS

U.S. Appl. No. 12/500,123, filed Jul. 9, 2009, Nishiyama.

* cited by examiner

*Primary Examiner* — Ping Hsieh
(74) *Attorney, Agent, or Firm* — Oblon, Spivak, McClelland, Maier & Neustadt, L.L.P.

(57) ABSTRACT

A communication apparatus of the present invention includes a transmission/reception coupler for performing a close-range one-to-one communication with a device of a communication counterpart by electric field coupling or magnetic field coupling; an intermittent operation unit for performing intermittent operation with a predetermined pause period provided when performing the communication with the device of the communication counterpart; and an intermittent operation cancel request unit for outputting a cancel request of canceling the intermittent operation of the device of the communication counterpart when transmitting a data frame to the device of the communication counterpart and a response with respect to the data frame is not received from the communication counterpart.

6 Claims, 10 Drawing Sheets

COMMUNICATION APPARATUS, COMMUNICATION SYSTEM, COMMUNICATION METHOD AND PROGRAM

BACKGROUND OF THE INVENTION

1. Field of the Invention

The present invention relates to a communication apparatus, a communication system, a communication method, and a program.

2. Description of the Related Art

In the related art, a technique of performing a check of a transmission device in the network even in the sleep mode when configuring a local area network (LAN) among a plurality of devices by transmitting a wireless signal to various types of devices is known, as described in Japanese Patent Application Laid-Open No. 2002-64501.

SUMMARY OF THE INVENTION

Nowadays, the transfer speed of data is increasing in wireless communication. In particular, in a close-range one-to-one communication (large-capacity proximity communication standard), which realization is presumed, data of large capacity can be transmitted in a very short period of time. When streaming a moving image worth one movie under such situation, the wireless data transfer speed is extremely higher than the speed of reproducing the data, and thus the transfer can be completed in a very short period of time with respect to the reproduction time.

If the data of large capacity such as moving image are sent all at once, the memory buffer capacity of the device on the reception side is made very large. Thus, under an environment in which the data transfer speed is very high, the data is divided and sent intermittently.

However, when sending the data intermittently, the data transfer stop period after transmitting the data becomes longer the data transfer speed becomes faster. Thus, the power consumption increases if the receiving operation is continuously performed in the data transfer stop period at the device on the reception side. At the device on the transmission side as well, the power consumption increases if the normal operation is performed in the data transfer stop period.

The present invention addresses the above-identified, and other issues associated with conventional methods and apparatuses, and it is desirable to provide a new and improved communication apparatus, a communication system, a communication method, and a program capable of suppressing the power consumption to a minimum and capable of reliably transferring the data frame in a system of close-range one-to-one communication in which the data transfer speed is extremely high.

According to an embodiment of the present invention, there is provided a communication apparatus including: a communication unit for performing a close-range one-to-one communication with a device of a communication counterpart by electric field coupling or magnetic field coupling; an intermittent operation unit for performing intermittent operation without releasing connection after the connection is established with the device of the communication part; an intermittent operation notifying unit for notifying the device of the communication counterpart of performing the intermittent operation, the intermittent operation notifying unit notifying without receiving a response to the notification; and an intermittent operation cancel request unit for outputting a cancel request of canceling the intermittent operation of the device of the communication counterpart when transmitting a data frame to the device of the communication counterpart and a response with respect to the data frame is not received from the communication counterpart.

Further, the data frame may be retransmitted to the device of the communication counterpart after receiving a response with respect to the cancel request from the device of the communication counterpart.

Further, the intermittent operation cancel request unit may determine whether or not the device of the communication counterpart is performing the intermittent operation based on a predetermined judgmental standard after transmitting the data frame to the device of the communication counterpart.

According to another embodiment of the present invention, there is provided a communication system including: a first communication apparatus for performing communication with a second communication apparatus through a close-range one-to-one communication by an electric field coupling or a magnetic field coupling; and a second communication apparatus including an intermittent operation unit for performing intermittent operation without releasing connection after the connection is established with the first communication device, an intermittent operation notifying unit for notifying the first communication apparatus of performing the intermittent operation, the intermittent operation notifying unit notifying without receiving a response to the notification, and an intermittent operation cancel request unit for outputting a cancel request of canceling the intermittent operation of the device of the communication counterpart when transmitting a data frame to the device of the communication counterpart and a response with respect to the data frame is not received from the communication counterpart.

According to another embodiment of the present invention, there is provided a communication method including the steps of: performing a close-range one-to-one communication with a device of a communication counterpart by electric field coupling or magnetic field coupling; performing intermittent operation without releasing connection after the connection is established with the device of the communication part; notifying the device of the communication counterpart of performing the intermittent operation, the notification being made without receiving a response to the notification; and outputting a cancel request of canceling the intermittent operation of the device of the communication counterpart when transmitting a data frame to the device of the communication counterpart and a response with respect to the data frame is not received from the communication counterpart.

According to another embodiment of the present invention, there is provided a program for causing a computer to function as: means for performing a close-range one-to-one communication with a device of a communication counterpart by electric field coupling or magnetic field coupling; means for performing intermittent operation without releasing connection after the connection is established with the device of the communication part; means for notifying the device of the communication counterpart of performing the intermittent operation, the unit notifying without receiving a response to the notification; and means for outputting a cancel request of canceling the intermittent operation of the device of the communication counterpart when transmitting a data frame to the device of the communication counterpart and a response with respect to the data frame is not received from the communication counterpart.

According to the present invention, the power consumption can be suppressed to a minimum and the data frame can be reliably transferred in the system of close-range one-to-one communication in which the data transfer speed is extremely high.

DETAILED DESCRIPTION OF THE PREFERRED EMBODIMENTS

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. The description is made in the following order.

1. Outline of communication system according to one embodiment of the present invention
2. Configuration of communication device
3. Hierarchical structure of software of the communication device
4. Regarding state transition of the communication device
5. Specific example of intermittent receiving operation
[Outline of Communication System According to One Embodiment of the Present Invention]

Figure 1:
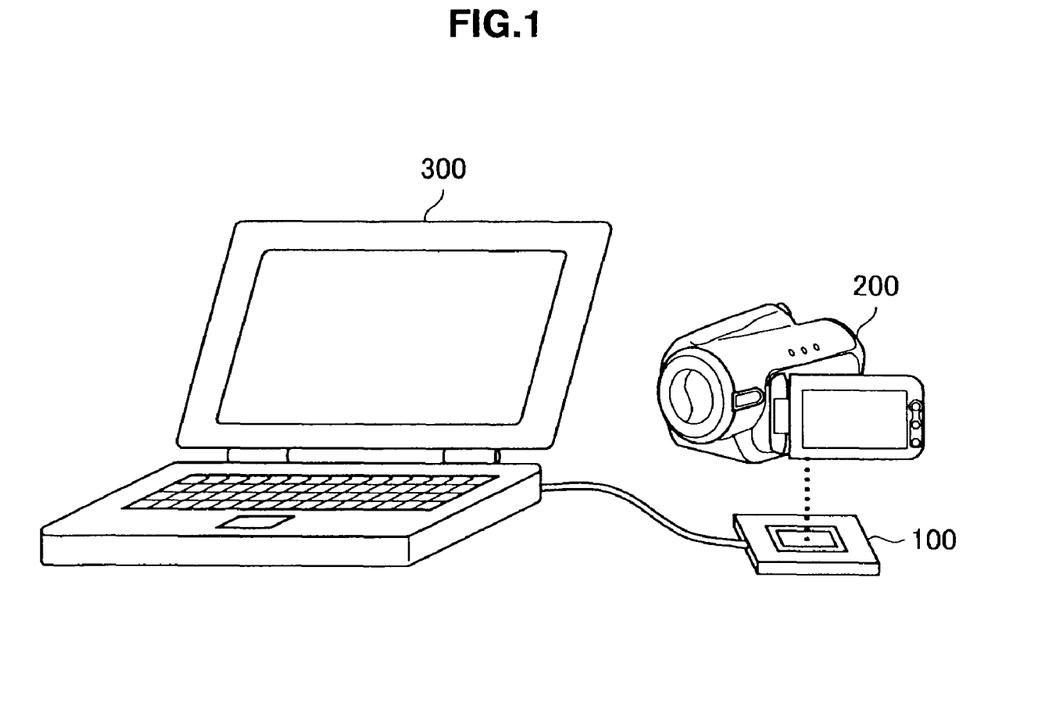
FIG. 1 is an explanatory view showing a communication system according to one embodiment of the present invention.

First, the outline of the communication system according to one embodiment of the present invention will be described with reference to FIGS. 1 and 2. FIG. 1 is an explanatory view showing the communication system according to one embodiment of the present invention. As shown in FIG. 1, the communication system according to the present embodiment includes a pair of devices (communication apparatuses) including a communication device 100 and a portable device 200 (video camera), and an information processing device (notebook personal computer) 300. The communication device 100 and the portable device 200 include an electrode plate called an electric field coupler capable of electric field coupling to each other. When the electric field couplers of both the communication device 100 and the portable device 200 are brought close to within 3 cm, one electric field coupler senses the change in inductive electric field generated by the other electric field coupler. The one-to-one electric field communication is then realized between the communication device 100 and the portable device 200.

More specifically, one of the pair of devices that perform the electric field communication functions as an initiator and the other device functions as a responder. The initiator is the side that makes the connection establishment request, and the responder is the side that waits for the connection establishment request from the initiator.

For instance, when the portable device 200 functions as the initiator and the communication device 100 functions as the responder, the communication device 100 receives a connection establishment request (connection request frame) transmitted from the portable device 200 when the portable device 200 and the communication device 100 are brought close. When the communication device 100 receives the connection establishment request, the communication device 100 transmits a connection response permission (connection response frame) to the portable device 200. The connection of communication between the communication device 100 and the portable device 200 is established when the portable device 200 receives the connection response permission. After the connection is established or at the same time as the connection establishment, the communication device 100 and the portable device 200 perform an authentication process, where the communication device 100 and the portable device 200 are in a data communicable state if the authentication process is normally terminated. The authentication process includes checking whether or not the version of the software, data transfer method, emulation method indicating the protocol of each device, and the like match in the communication device 100 and the portable device 200.

Thereafter, the communication device 100 and the portable device 200 perform data communication at one to one. More specifically, the portable device 200 transmits arbitrary data to the communication device 100 through the electric field coupler, and the communication device 100 outputs the data received from the portable device 200 to the information processing device 300. Alternatively, arbitrary data is input from the information processing device 300 to the communication device 100, and the communication device 100 transmits the data input from the information processing device 300 to the portable device 200 through the electric field coupler. The arbitrary data includes music data such as music, lecture and radio program, video data such as movie, television program, video program, picture, document, drawing, and figure, game, software, and the like.

As opposed to the electric wave radiated from the antenna of electric wave communication method attenuating inversely proportional to the square of the distance, the intensity of the inductive electric field generated from such electric field coupler is inversely proportional to the fourth power of the distance, and thus the distance between the pair of devices that can perform electric field communication can be limited. In other words, according to the electric field communication, degradation of signal due to obstacles existing at the periphery is small, and a technique for ensuring hacking and confidentiality can be simplified.

The electric wave radiated from the antenna contains horizontal wave component that vibrates in a direction orthogonal to the advancing direction of the electric wave, and includes a polarized wave. The electric field coupler contains vertical wave component that vibrates in the advancing direction, does not include a polarized wave and generates the inductive electric field, and thus convenience is high in that the signal can be received on the reception side as long as the surfaces of the pair of electric field couplers are facing each other.

In the specification, description will be made focusing on an example in which a pair of communication apparatuses performs close-range wireless communication (non-contact communication, large-capacity proximity communication) using the electric field couplers, but the present invention is not limited to such example. For instance, the pair of communication apparatuses can perform close-range wireless communication through a communication unit capable of communicating through magnetic field coupling. According to the communication method using electric field coupling or magnetic field coupling, the signal is not transmitted if the communication counterpart is not close, and thus such communication method is advantageous than the electric wave communication method in that the issue of interference is less likely to occur.

The communication device 100 and the portable device 200 are shown in FIG. 1 as examples of the communication apparatus, but the present invention is not limited to such example. The communication apparatus may be an information processing device such as PC (Personal Computer), household video processing device (DVD recorder, video cassette recorder etc.), portable telephone, PHS (Personal Handyphone System), and the like. The communication apparatus may also be an information processing device such as portable music reproduction device, portable video processing device, PDA (Personal Digital Assistants), household game machine, portable game machine, and home electronics. The communication device 100 is connected to the information processing device 300 in FIG. 1, but the information processing device 300 and the communication device 100 may be integrally configured.

[Configuration of Communication Device]

Figure 2:
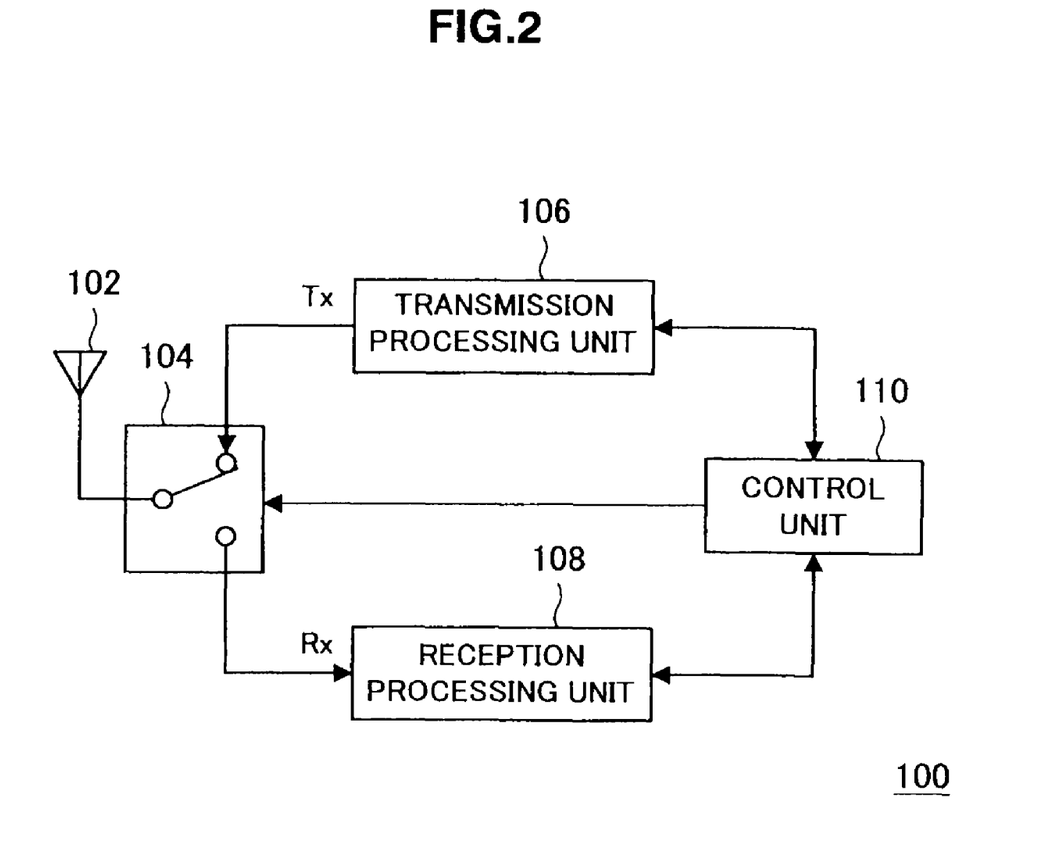
FIG. 2 is a schematic view for describing a configuration related to transmission and reception of data of a communication device.

FIG. 2 is a schematic view for describing a configuration related to transmission and reception of data of the communication device 100. The configuration related to transmission and reception of data is similar in both the communication device 100 and the portable device 200, and thus the portable device 200 also has the configuration shown in FIG. 2.

As shown in FIG. 2, the communication device 100 includes a transmission/reception coupler (communication unit) 102, a selector 104, a transmission processing unit 106, a reception processing unit 108, and a control unit 110. The transmission/reception coupler 102 is configured by an electric field coupler, and performs communication with the electric field coupler of the portable device 200 through electric field coupling. The transmission/reception couplers 102 of the communication device 100 and the portable device 200 are arranged facing each other at a close-range of about 3 cm, and can be electrostatically coupled. The transmission/reception coupler 102 is selectively connected to either the transmission processing unit 106 or the reception processing unit 108 by way of the selector 104.

The transmission processing unit 106 generates a transmission signal to transmit from the transmission reception coupler 102 to the portable device 200. The transmission processing unit 106 includes components such as a coder for coding the transmission data, a diffuser for diffusing the transmission data, a mapper for extending the transmission data from a binary sequence to a complex signal, an RF circuit for performing up conversion to a central frequency, and the like. The reception processing unit 108 decodes the reception signal received by the transmission/reception coupler 102. The reception processing unit 108 includes components such as a RF circuit input with the reception signal, an AD converter for converting the reception signal to a digital signal, a demapper for demapping the reception signal, a decoder, and the like. The transmission processing unit 106 generates a high frequency transmission signal such as UWB signal based on the transmission data when a transmission request is made from the higher level application, and the signal is propagated from the transmission/reception coupler 102 to the portable device 200. The transmission/reception coupler 102 on the portable device 200 side performs demodulation and decoding process on the received high frequency signal, and provides the reproduced data to the higher level application. Similar process is performed when sending the data from the portable device 200 side to the communication device 100. Therefore, bidirectional communication is realized between the communication device 100 and the portable device 200.

For instance, according to the communication method using high frequency and wide band as in UWB communication, ultra-high speed data transmission of about 100 Mbps can be realized at close-range. When performing the UWB communication by electrostatic coupling instead of the electric wave communication, a very weak electric wave that does not require the permission of the wireless station can be obtained by suppressing the electric field intensity (intensity of electric wave) at a distance of three meters from the wireless facility to smaller than or equal to a predetermined level since the electric field intensity is inversely proportional to the fourth power of the distance. Thus, the communication system can be inexpensively configured. Furthermore, when performing data communication at a very close-range by the electrostatic coupling method, the quality of signal does not lower by the reflective object existing at the periphery, hacking on the transmission path can be reliably prevented, and confidentiality can be ensured. A configuration in which two devices may not simultaneously communicate to one device can be realized by suppressing the electric field intensity to smaller than or equal to a predetermined level such as allowing communication only at a distance of within 3 cm. Therefore, one-to-one communication at close-range can be realized.

The control unit 110 is configured by a calculation processing unit such as CPU, and controls the entire operation of the communication device 100. For instance, the control unit 110 controls the generation of the transmission signal by the transmission processing unit 106, and controls the decoding of the reception signal by the reception processing unit 108. The control unit 110 outputs a switch signal to the selector 104 to connect the transmission/reception coupler 102 and the transmission processing unit 106 when transmitting the connection request frame C-Req and the like to the portable device 200. The control unit 110 outputs a switch signal to the selector 104 to connect the transmission/reception coupler 102 and the reception processing unit 108 when waiting for the connection request frame C-Req from the portable device 200.

The connection is established when one device (initiator) transmits the connection request frame C-Req to the other device (responder), and the initiator receives the connection response frame C-Acc transmitted from the responder. The connection request frame is transmitted to the communication counterpart by a device on the side input with user action such as data file transfer and data file selection.

The connection request frame can be periodically transmitted at a predetermined timing regardless of the presence of the user action. In this case, the transmission of the connection request frame C-Req by the communication device 100 is periodically made at a predetermined cycle regardless of whether or not the communication counterpart is positioned nearby. Thus, even if the user action such as file transfer is not made from the initiator, the responder can receive the periodically transmitted connection request frame C-Req. The connection is established by returning the connection response frame C-Acc from the responder. Therefore, in a case where the user action is not particularly made, the connection can be established by bringing the initiator and the responder close to a range where proximate wireless communication can be carried out. When connection is established, the negotiation, to be hereinafter described, is performed, and when the negotiation is completed, both the initiator and the responder can reference the memory such as the hard disc of the counterpart. The transfer and the like of the data file can be carried out by specifying the data file from the directory. The transfer of the data file is performed by the CSDU packet.

[Hierarchical Structure of Software of the Communication Device]

Figure 3:
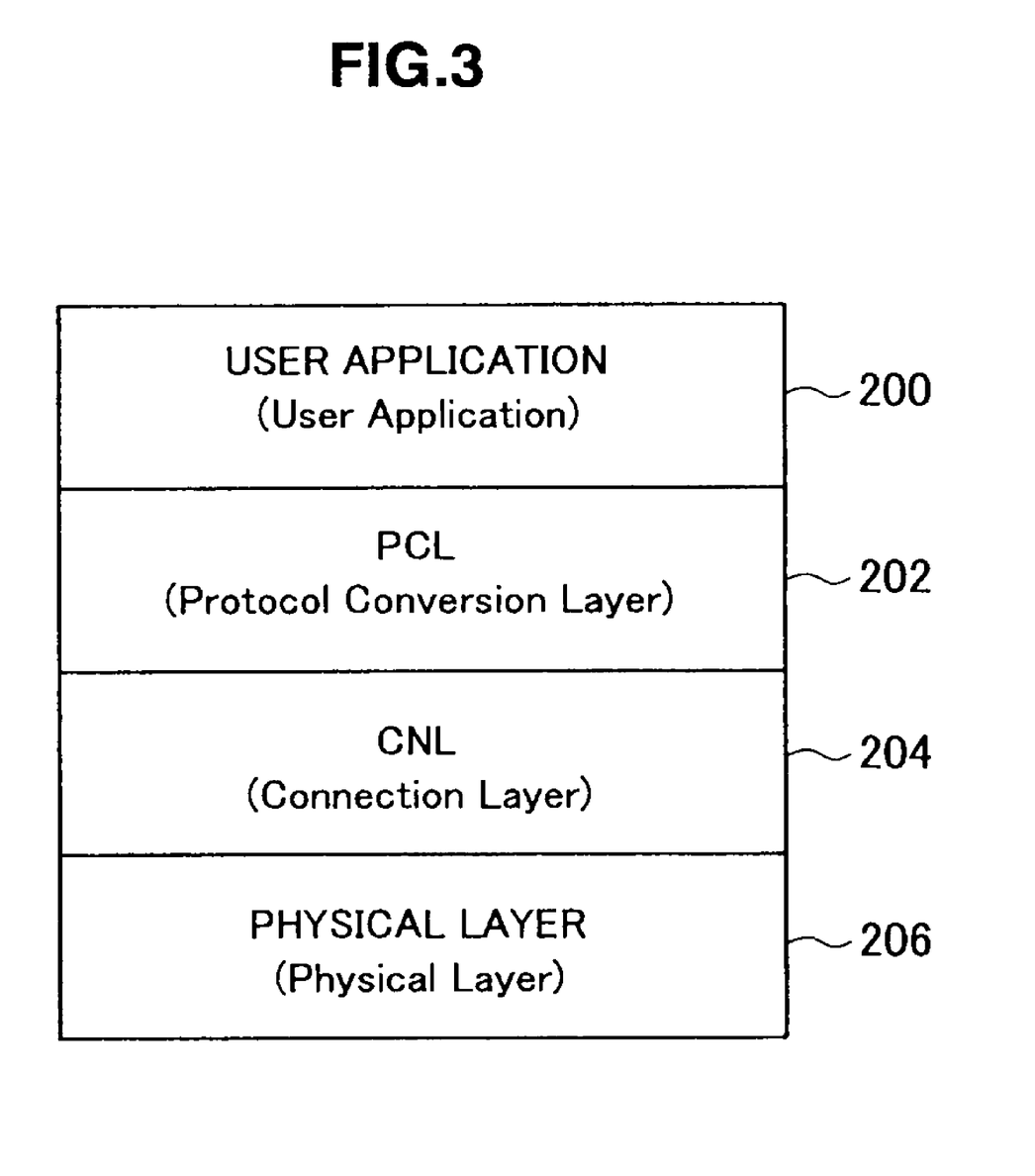
FIG. 3 is a schematic view showing the software configuration of each device of the initiator and the responder as a hierarchical structure.

FIG. 3 is a schematic view showing the software configuration of each device of the initiator and the responder as a hierarchical structure in the wireless communication system according to the present embodiment. As shown in FIG. 2, in the present embodiment, a user application 200, a PCL (Protocol Conversion Layer) 202, a CNL (Connection Layer) 204, and a physical layer 206 are configured in order from the upper layer.

The user application 200 is the higher level protocol (e.g., USB, TCP/IP, OBEX, etc.) for performing data communication using the service provided by the software of upper layer of the physical layer 206 in the device mounted with the physical layer 206. The user application 200 is the application (e.g., OS such as Windows (registered trademark)), Linux etc.) for performing the device operation.

The PCL 202 (protocol conversion unit) supports the protocol conversion function for mutually converting the user application 200 to a unique protocol. Various protocols then can be supported by providing a plurality of types of protocols to the physical layer 206. The PCL 202 performs a process of converting the content data such as audio and video generated by the user application 200 of higher level, data of other protocols, commands and the like to a data format that can be handled by the CNL 204 of lower level. The PCL 202 also performs processes necessary for communication such as connection, disconnection, device authentication, operation mode setting, and initialization.

The CNL 204 shapes the data received from the PCL 202 of higher level to a predetermined packet structure (CSDU packet), and performs transmission between the initiator and the responder. In the CNL 204, the parameter for understanding the type of CSDU packet is added to the CSDU packet header. In reception, the CNL 204 analyzes the data received from the physical layer 206, extracts the CSDU packet, and provides the payload thereof to the PCL 202 of higher level. The CSDU contains status information usable in the user application 200 other than the communication by the physical layer 206, and the CNL 204 also performs generation process thereof, error notification, and the like.

The CNL 204 itself can receive data transmitted from different protocols from the PCL 202. However, since transmission and reception of data of different protocols require once disconnecting the session in the large-capacity proximity communication, use of the CNL service in a plurality of protocols is not performed.

Due to such limitation, even if input of data is made from a plurality of PCL Emulations to the CNL 204, the CNL 204 does not multiplex such data. Furthermore, even if the reception data contains a plurality of protocols, processes such as analysis of the protocol, distribution to the PCL 202 according to the respective protocol content, or disconnection of session by error detection are not performed.

Thus, on the PCL 202 side using the service by the CNL 204, the service by the CNL 204 is used with the protocol to use decided on one type. Determination on confirming the protocol method and performing the necessary transmission and reception are roles of the PCL Common, to be hereinafter described, and generation of the protocol data and parse are performed by the PCL Emulation. Exclusion process is also performed by the PCL Common so that the CNL service is not simultaneously used from a plurality of protocols.

The CNL 204 provides the service necessary for the PCL Common to establish the connection, and the service necessary for the PCL Emulation to transmit and receive data after the connection is established. The CNL 204 receives profile ID indicating whether the currently executed service is the intermediate data of the entire transfer size, the last data, or is a parameter and not data, data size, and the like from the PCL 202 as parameters. Such parameters are inserted to the CSDU packet header. The CNL 204 embeds the transmission parameter to one part of the CSDU packet generated when the large-capacity proximity communication device transmits the data to realize a plurality of logic channels (Channel) on one physical layer (PHY Layer) 206.

The CNL 204 performs data transfer in units of CSDU. The CNL 204 gives the following three types of profile IDs (T_DATA, LT_DATA, CNL_DATA) to the CSDU in time of CSDU transmission. In CSDU reception, the CNL 204 performs a process corresponding to the type of profile ID.

T_DATA, LT_DATA

The CNL 204 gives T_DATA to the CSDU transferring the user data. However, if it is the last CSDU in the division to the CSDU payload, the CNL 204 gives LT_DATA. Only the user data is stored in the payload of the CSDU, and the CNL 204 does not embed the header information and the like.

CNL_DATA

The CNL 204 gives CNL_DATA to the CSDU for transferring the control data unique to the large-capacity proximity communication system. Example of the control data is parameter information. The header information is embedded in the CSDU payload. The CNL 204 analyzes such header information, and performs an appropriate process.

The CNL 204 performs the communication using the service of the physical layer 206 in response to the request of the higher level layer, and in addition, performs establishment of the connection of the physical layer 206, disconnection, guarantee of continuity of data, and the like.

In the large-capacity proximity communication, transmission and reception of not only data such as files but of management parameters in the PCL 202 and data between the same layers of the communicating destination exist. Such files and parameter types are ultimately transmitted by the CNL 204 in a form complying with the CSDU format. The Profile ID is used to specify the type of data. A plurality of transmission channels then can be logically used at the physical layer 206 level. Therefore, the communication rate can be greatly enhanced, and in particular, it is suitable for data communication of large-capacity such as moving image.

The physical layer 206 is a physical layer for large-capacity proximity communication of wireless communication system capable of carrying out the close-range large-capacity communication according to the present embodiment, and includes an error correcting function and a preamble sense function. In the present embodiment, the physical layer for large-capacity proximity communication is described by way of example for the physical layer of the communication device, but the physical layer is not limited thereto, and application to a versatile physical layer for communication can be made. The physical layer for large-capacity proximity communication is particularly suited to data communication of large capacity such as pictures and moving images by using the CSDU packet, the profile ID, and the like.

Figure 4:
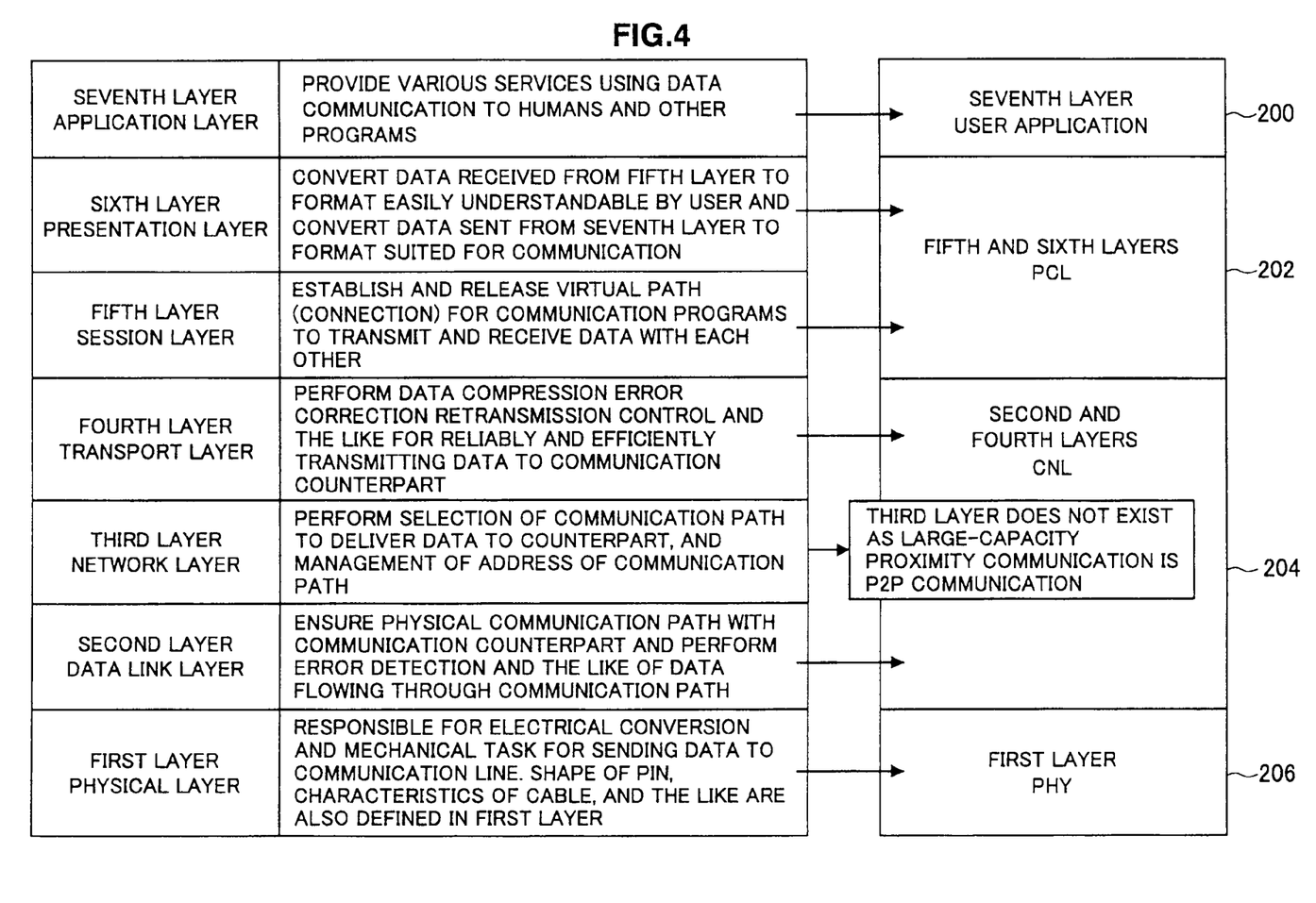
FIG. 4 is a schematic view showing the configuration of FIG. 3 in OSI reference model.

FIG. 4 shows the configuration of FIG. 3 in OSI reference model based on the role of the software. As shown in FIG. 4, the physical layer (first layer) 206 is responsible for electrical conversion and mechanical task for sending data to the communication line. The shape of the pin, characteristics of the cable, and the like are also defined in the first layer.

The CNL 204 corresponds to the data link layer (second layer) and the transport layer (fourth layer). The data link layer ensures a physical communication path with the communication counterpart, and performs error detection and the like of the data flowing through the communication path. The transport layer performs data compression, error correction, retransmission control and the like for reliably and efficiently transmitting the data to the communication counterpart. Since the system of the present embodiment is a P2P communication, the network layer (third layer) in the OSI reference model is not arranged, and the system can be simplified.

The PCL 202 corresponds to the session layer (fifth layer) and the presentation layer (sixth layer). The session layer performs establishment and release of a virtual path (connection) for the communication programs to transmit and receive data with each other. The presentation layer performs processes such as converting the data received from the session layer to a format easily understandable by the user, and converting the data sent from the application layer to a format suited for communication.

The user application 200 corresponds to the application layer (seventh layer). The application layer provides various services using data communication to humans and other programs.

[Regarding State Transition of the Communication Device]

Figure 5:
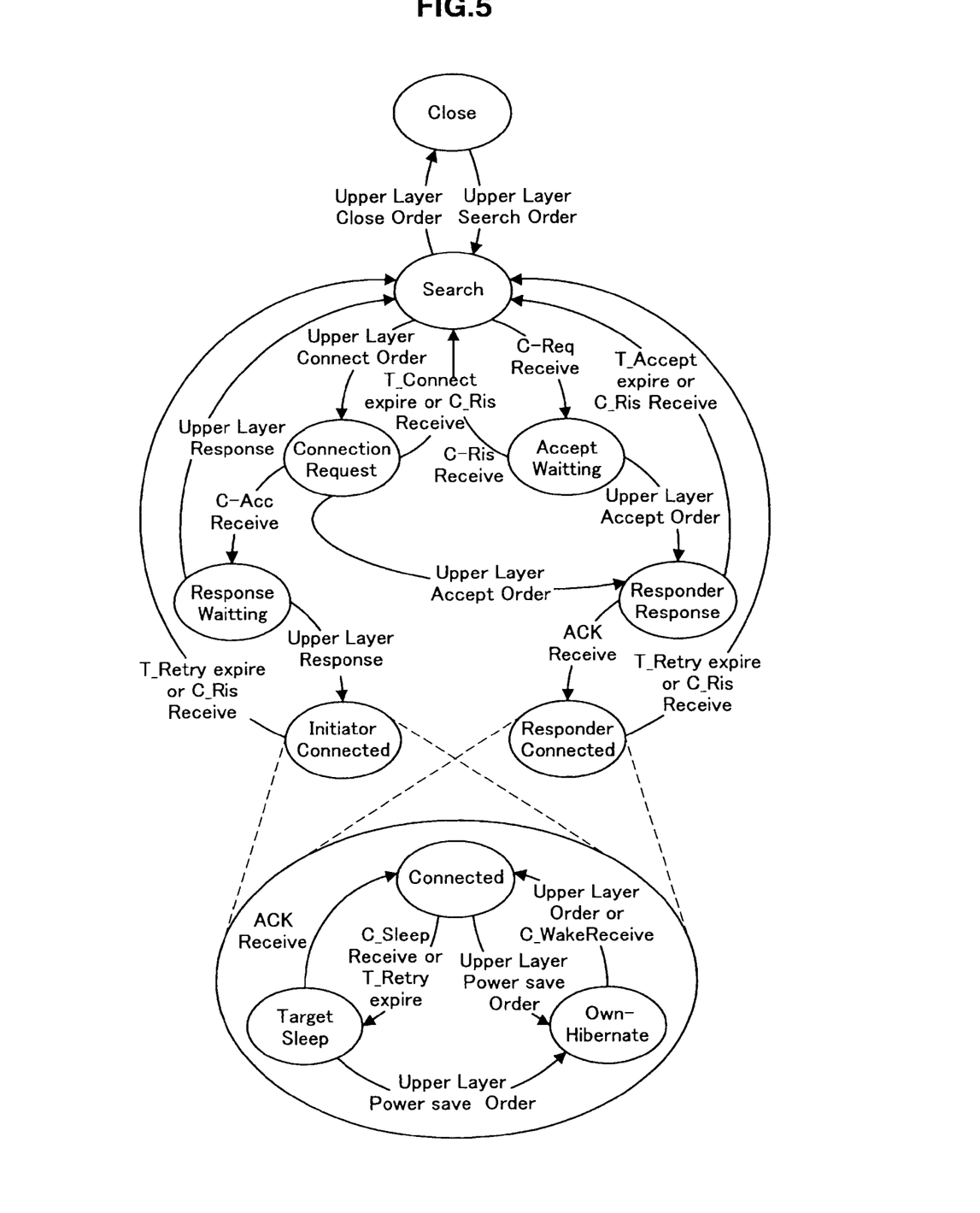
FIG. 5 is a schematic view showing a state transition at the layer of CNL.

In the system of the present embodiment, each communication apparatus of the initiator and the responder can transition to an intermittent receiving operation (power save operation) after the connection is established. FIG. 5 is a schematic view showing the state transition at the layer of the CNL 204 in the system of the present embodiment. The state transition including the power save mode will be described based on FIG. 5.

In FIG. 5, the state (Search) is a state waiting for the connection request C-Req. The responder is in a response waiting state (Accept Waiting) from the PCL 202 which is the higher level layer when receiving the C-Req in the state (Search). When response of connection permission (Accept) is made from the PCL 202 in such state, C-Acc is transmitted and the state transitions to a state (Responder Response). The state returns to the state (Search) when receiving the release frame C-Ris in the response waiting state (Accept Waiting).

The state transitions from the state (Responder Response) to the state (Responder Connected) when receiving the ACK. The connection is thereby established.

The initiator transmits the C-Req when the connection request is made from the higher level layer in the state (Search), and the state transitions to the state (Connection Request). When receiving C-Acc in the state (Connection Request), the state transitions to the state (Response Waiting) to be in a response waiting state from the higher level layer. When the connection permission is output from the higher level layer in the state (Response Waiting), the state transitions to the state (Initiator Connected). The connection is thereby established. The state returns to the state (Search) when the connection is not permitted from the higher level layer in the state (Response Waiting).

In the state after the connection is established (Initiator Connected, Responder Connected), the state transitions among the state (Connected), the state (Own-Hibernate), and the state (Target Sleep) as long as the connection is not released. The state is the state (Connected) after the connection is established, and transitions to the state (Own-Hibernate) when an instruction (Upper Layer Power-save Order) notifying of transition to the power save mode is output from the PCL 202 which is the higher level layer.

In the state (Own-Hibernate), the intermittent receiving operation is performed. When transitioning to the state (Own-Hibernate), C-Sleep frame is transmitted to the device of the communication counterpart. When an instruction to release the power save mode is output from the PCL 202 or C-Wake is received from the communication counterpart in the state (Own-Hibernate), the state returns to the state (Connected).

The state transitions to the state (Target Sleep) when receiving C-Sleep in the state (Connected). In this case, the device of the communication counterpart can be recognized to be able to transition to the power save mode. When an instruction (Upper Layer Power-save Order) notifying of transition to the power save mode is output from the PCL 202 in the state (Target Sleep), the state transitions to the state (Own-Hibernate). The own device then also transitions to the sleep mode. When receiving ACK in the state (Target Sleep), the state returns to the state (Connected).

[Specific Example of Intermittent Receiving Operation]

Figure 6:
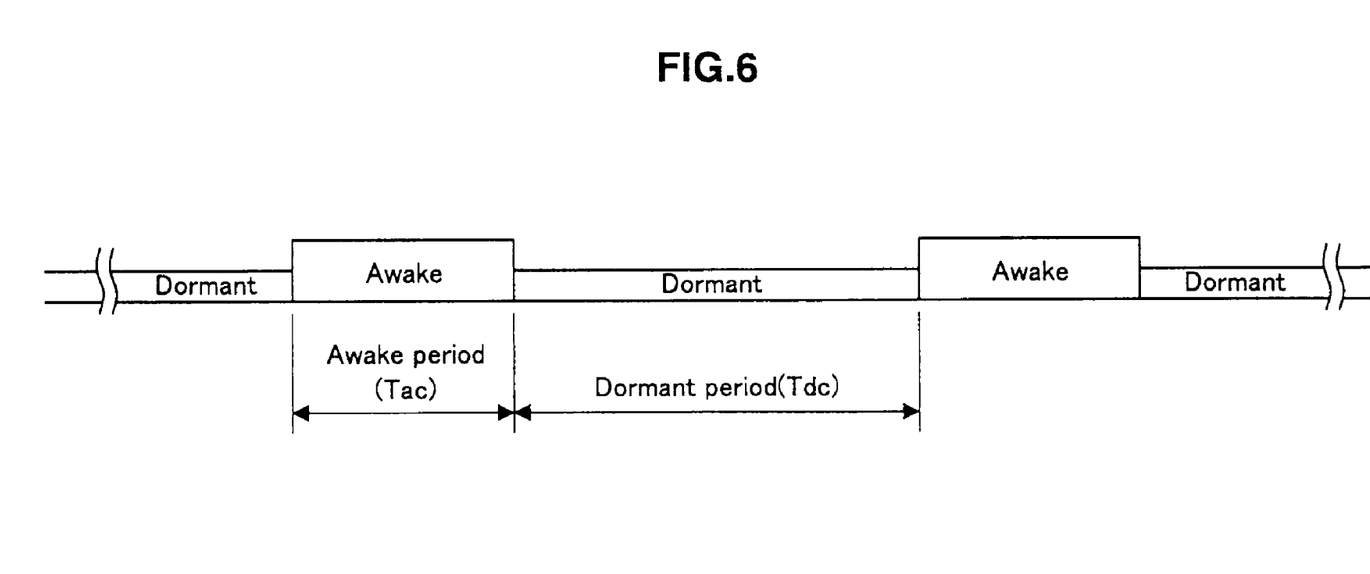
FIG. 6 is a schematic view showing the intermittent receiving operation.

As described above, in the system of the present embodiment, the intermittent receiving operation is performed when receiving an instruction to transition to the intermittent receiving operation from the higher level layer after the connection is established. FIG. 6 is a schematic view showing the intermittent receiving operation. After the connection is established, the reception is normally performed on a steady basis. In the intermittent receiving operation, a reception (Awake) period is set at a predetermined time interval, the period transitions to a pause (Dormant) period after the reception period is elapsed, and the receiving operation is stopped. In the pause period, the power of the transmission processing unit 106, the reception processing unit 108, and the like of the communication device is suppressed to a minimum. Therefore, the power consumption can be suppressed to a minimum by setting the pause period.

Figure 7:
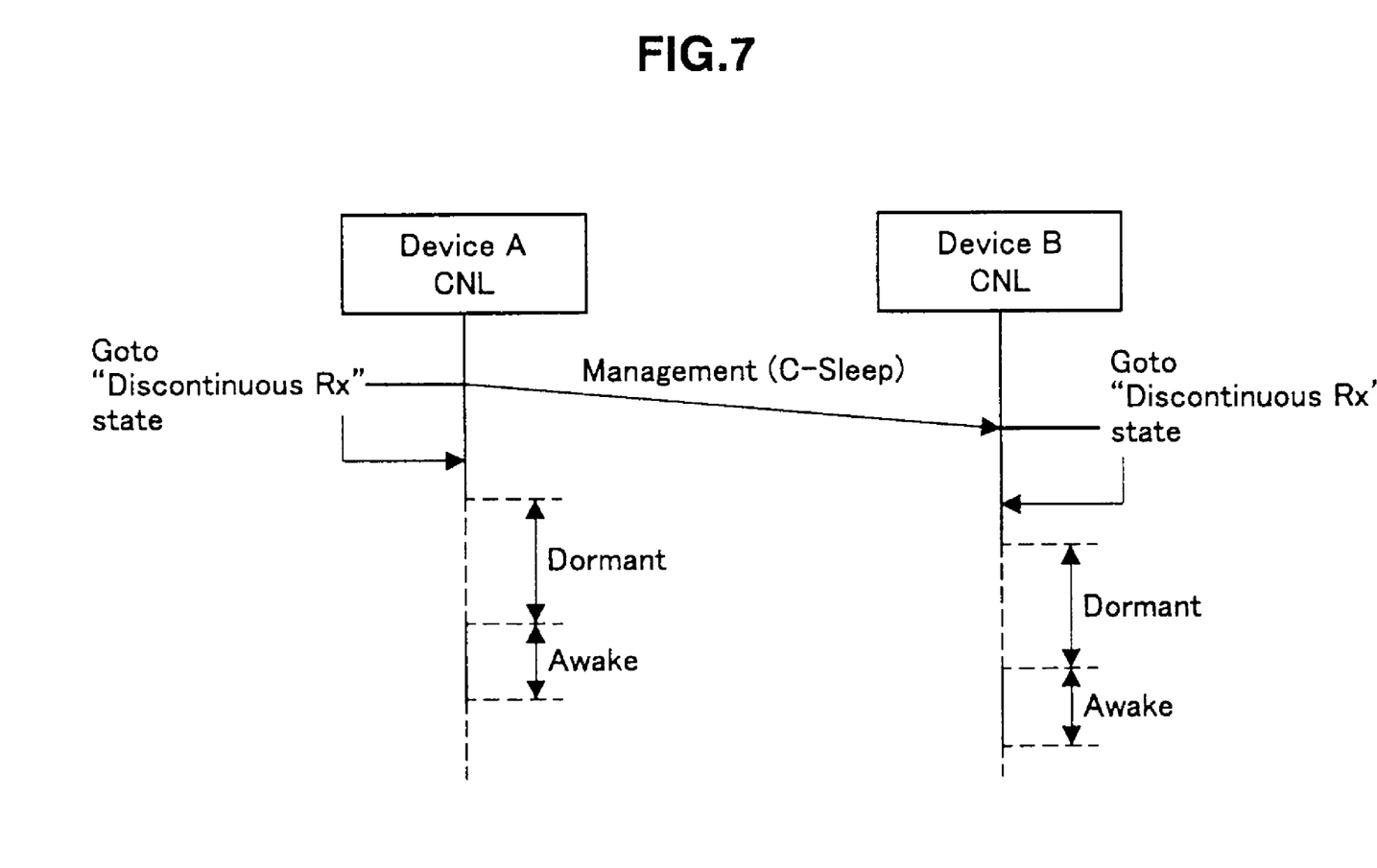
FIG. 7 is a schematic view showing a power save operation after the connection is established when the connection of a device A and a device B is established.

FIG. 7 is a schematic view showing the power save operation after the connection is established when the connection of a device A and a device B is established. After the connection is established, when permitting the intermittent receiving operation with respect to the device of the communication counterpart, this is notified by transmitting the C-Sleep frame. When the own device also starts the intermittent receiving operation, notification is made to the counterpart device by transmitting the C-Sleep frame. In the example of FIG. 7, the device A transmits the C-Sleep frame to the device B so that the own device performs the intermittent receiving operation. In the device A, the reception period and the pause period of a predetermined time are alternately repeated. In the example of FIG. 7, the device B receiving the C-Sleep frame performs the intermittent receiving operation since the intermittent receiving operation is permitted. As the C-Sleep frame is a frame indicating that the intermittent operation is possible, the device B transmitting the C-Sleep may not perform the intermittent operation. Similarly, the device A may not perform the intermittent operation when the device A receives the C-Sleep frame.

The C-Sleep frame is described with time information related to the pause period and the reception period. The devices A and B set the pause period and the reception period according to such information and perform the reception intermittently to save power.

When transmitting the data frame intermittently in transmitting and receiving data of large capacity such as moving image data, the power consumption can be reduced by setting the period in which transmission is not performed to the power save mode. In particular, since the data can be transferred at extremely high speed in the communication by the physical layer for large-capacity proximity communication, the transfer speed becomes very fast with respect to the amount of data to transmit when transmitting the moving image data and the like. In such case, the capacity of the buffer of the device on the reception side is large when the data is sent all at once, but the buffer amount of the device on the reception side can be suppressed to a minimum by intermittently performing the data transfer. In the present embodiment, the power consumption can be greatly reduced by performing the intermittent operation under a situation where the transfer speed can be extremely increased.

Figure 8:
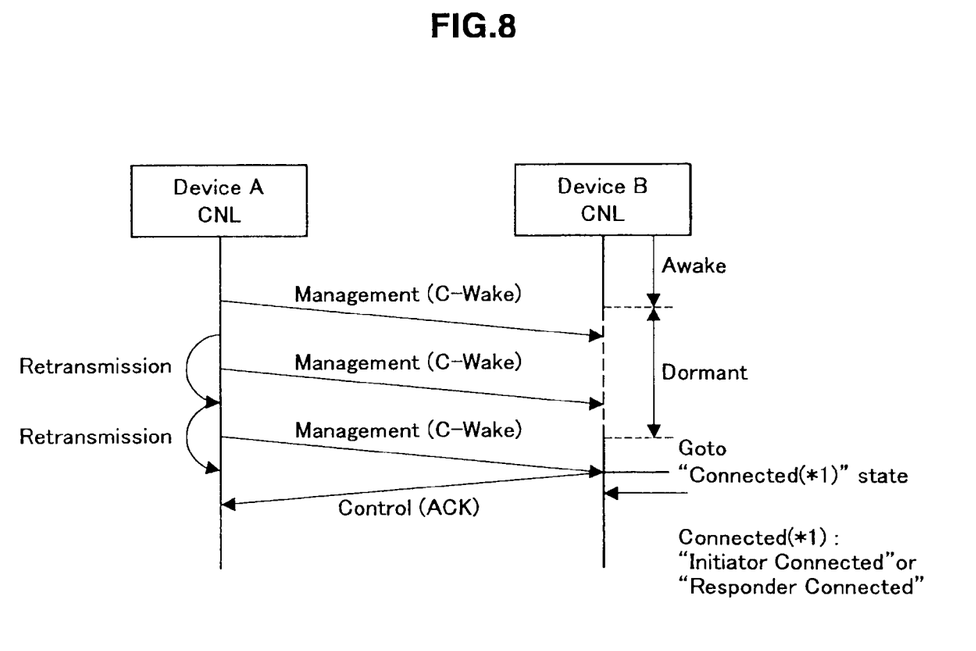
FIG. 8 is a schematic view showing the operation of when canceling the intermittent receiving operation.

FIG. 8 is a schematic view showing the operation of when canceling the intermittent receiving operation. In FIG. 8, the device B is assumed to be in the power save mode. When canceling the intermittent receiving operation, the device A transmits the C-Wake frame to the device B of the communication counterpart. The device B may not receive the C-Wake frame in the pause period, but cancels the intermittent receiving operation when receiving the C-Wake frame in the reception period. The device A repeats the retransmission of the C-Wake frame until receiving the ACK frame response with respect to the C-Wake frame from the device B. The device A determines that the connection with the device B is disconnected if the retransmission of a constant time C-Wake is repeated but the ACK response is not obtained.

If the C-Sleep frame gets lost on the wireless media when the communication apparatus performing the intermittent receiving operation sends the C-Sleep frame to the device of the communication counterpart, the C-Sleep may not be normally received at the device on the communication counterpart side. In such case, the device that did not receive the C-Sleep may not recognize that the communication counterpart is in the power save mode, and thus transmits the CSDU packet which is the data frame to the device of the communication counterpart. The device in power save mode receiving the CSDU packet may not receive the CSDU packet depending on the timing of the pause period since such device is performing the intermittent receiving operation.

Figure 9:
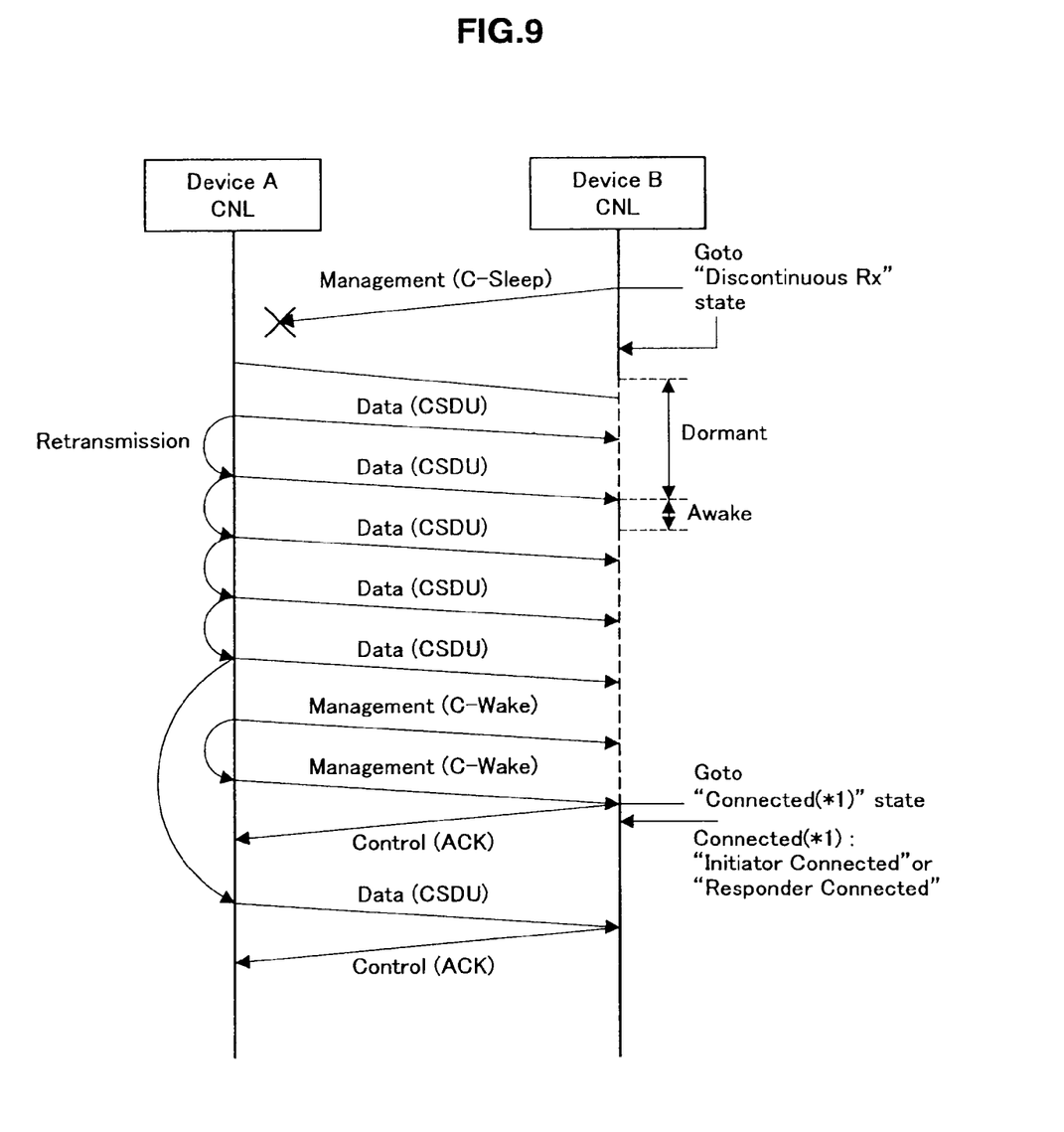
FIG. 9 is a schematic view showing a case in which the device A does not receive the C-Sleep frame.

FIG. 9 shows a case in which the CSDU packet is transmitted from the device A to the device B since the device A did not receive the C-Sleep frame when the device B transmitted the C-Sleep frame to the device A. The device B receiving the CSDU packet normally transmits ACK to the device A, but a case in which the device B is performing the intermittent operation and in which the pause period of the device B and the timing of the CSDU packet transmitted from the device A are overlapping is shown in FIG. 9. In this case, the device B does not receive the CSDU packet, and thus may not transmit the ACK to the device A. In other words, if the reception period of the device B is set shorter than the period for receiving the CSDU packet, the possibility the device B does not receive the CSDU packet in the reception period is high.

In the present embodiment, the device A determines that the device B is performing the intermittent receiving operation if ACK is not returned from the device B even after a predetermined time has elapsed although the device A has transmitted the CSDU packet, and transmits C-Wake frame to the device B. The device B then cancels the intermittent receiving operation and transmits ACK to the device A. The device A determines that the device B has canceled the intermittent receiving operation when receiving ACK with respect to C-Wake frame, and transmits the CSDU packet to the device B. The judgmental standard related to whether or not the communication counterpart side is performing the intermittent receiving operation may be other judgmental standards such as number of times the CSDU packet is retransmitted other than the predetermined time used above.

According to the present embodiment, a simple configuration in which ACK is not returned with respect to a command notifying the start of the intermittent operation such as C-sleep frame is adopted. In the configuration in which ACK is not returned with respect to C-Sleep, the device on the side that transmitted the C-Sleep may not recognize that C-sleep did not reach the device of the communication counterpart when an event in which some kind of issue occurred during communication and C-sleep did not reach the counterpart device occurs. In this case, when the device on the side that transmitted C-sleep starts the intermittent operation, an event in which the device that did not receive C-sleep transmits the CSDU packet to the device performing the intermittent operation occurs. According to the present embodiment, when the system in which ACK is not returned with respect to C-sleep is adopted, C-wake frame is transmitted if ACK is not returned with respect to the CSDU packet, and thus the intermittent operation of the communication counterpart can be cancelled and the CSDU packet can be transmitted. In the system in which ACK is returned with respect to the transmission of C-sleep, the start of the intermittent operation is recognized by both devices as the intermittent operation does not start until confirmed by the return of ACK that C-sleep reached the communication counterpart. Therefore, in the system in which ACK is returned with respect to the transmission of C-sleep, the transmission of the CSDU packet to the device performing the intermittent operation can be avoided, but the device receiving C-sleep returns ACK, and thus the system becomes complicating.

Figure 10:
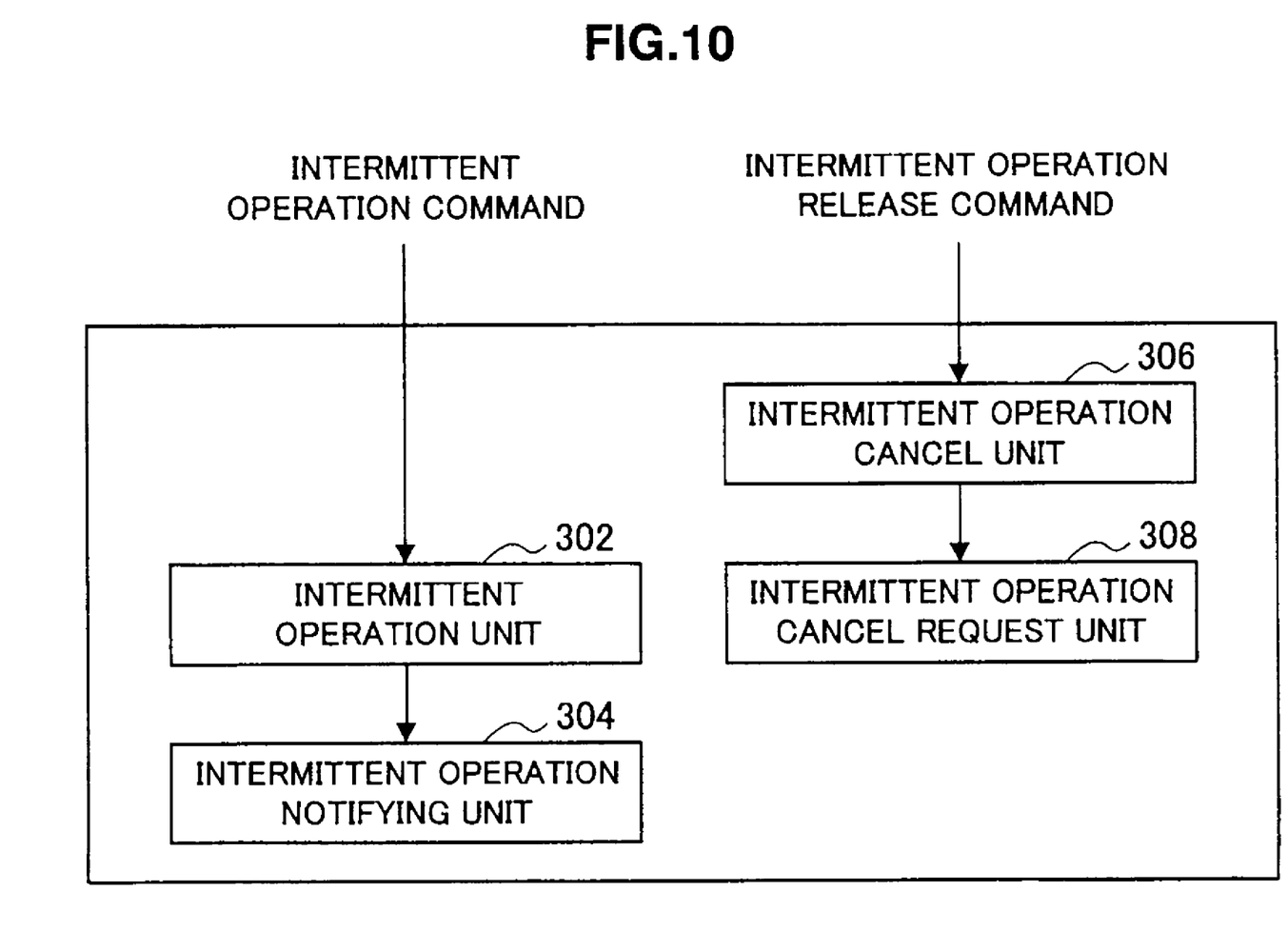
FIG. 10 is a schematic view showing a function block configuration of a communication device associated with intermittent operation.

FIG. 10 is a schematic view showing a function block configuration of the communication device associated with the intermittent operation. As shown in FIG. 10, the communication device includes an intermittent operation unit 302, an intermittent operation notifying unit 304, an intermittent operation cancel unit 306, and an intermittent operation cancel request unit 308. The intermittent operation unit 302 performs the intermittent operation based on the command from the higher level layer. The intermittent operation notifying unit 304 transmits C-Sleep to the device of the communication counterpart. In this case, the intermittent operation notifying unit 304 transmits C-Sleep without requesting for ACK with respect to C-Sleep. Therefore, the communication device does not receive the response with respect to C-Sleep. The intermittent operation cancel unit 306 cancels the intermittent operation based on the command from the higher level layer. The intermittent operation cancel request unit 308 determines whether or not the device of the communication counterpart is performing the intermittent operation based on the above-described judgmental standard, and transmits C-Wake to the device of the communication counterpart. The function block shown in FIG. 10 can be configured by hardware (circuit) or calculation processing unit (CPU) and software (program) for functioning the same. When configured by the calculation processing unit (CPU) and the software, the function blocks are mainly configured by the CNL 204 described above, and the program can be stored in the recording medium such as memory arranged in the communication device 100 and the portable device 200.

Therefore, in the present embodiment, determination is made that the communication counterpart is performing the intermittent receiving operation if ACK is not returned with respect to the CSDU packet when the C-Sleep frame is not normally transmitted or received, and the fact that the device of the communication counterpart is performing the intermittent receiving operation may not be recognized. Therefore, the intermittent receiving operation of the device of the communication counterpart may be canceled by transmitting C-Wake packet to the device of the communication counterpart, and the CSDU packet can be transmitted thereafter. In the example described above, the wireless communication system has been described by way of example, but the communication system may be a wired communication system.

The present invention contains subject matter related to Japanese Patent Application JP 2008-215842 filed in the Japan Patent Office on Aug. 25, 2008, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication apparatus comprising:
a communication unit for performing a close-range one-to-one communication with a device of a communication counterpart by electric field coupling or magnetic field coupling;
an intermittent operation unit for performing intermittent operation without releasing connection after the connection is established with the device of the communication part;
an intermittent operation notifying unit for notifying the device of the communication counterpart of performing the intermittent operation, the intermittent operation notifying unit notifying without receiving a response to the notification; and
an intermittent operation cancel request unit for outputting a cancel request of canceling the intermittent operation of the device of the communication counterpart when transmitting a data frame to the device of the communication counterpart and a response with respect to the data frame is not received from the communication counterpart.

2. The communication apparatus according to claim 1, wherein the data frame is retransmitted to the device of the communication counterpart after receiving a response with respect to the cancel request from the device of the communication counterpart.

3. The communication apparatus according to claim 1, wherein the intermittent operation cancel request unit determines whether or not the device of the communication counterpart is performing the intermittent operation based on a predetermined judgmental standard after transmitting the data frame to the device of the communication counterpart.

4. A communication system comprising:
a first communication apparatus for performing communication with a second communication apparatus through a close-range one-to-one communication by an electric field coupling or a magnetic field coupling; and
a second communication apparatus including an intermittent operation unit for performing intermittent operation without releasing connection after the connection is established with the first communication device, an intermittent operation notifying unit for notifying the first communication apparatus of performing the intermittent operation, the intermittent operation notifying unit notifying without receiving a response to the notification, and an intermittent operation cancel request unit for outputting a cancel request of canceling the intermittent operation of the device of the communication counterpart when transmitting a data frame to the device of the communication counterpart and a response with respect to the data frame is not received from the communication counterpart.

5. A communication method comprising the steps of:
performing a close-range one-to-one communication with a device of a communication counterpart by electric field coupling or magnetic field coupling;
performing intermittent operation without releasing connection after the connection is established with the device of the communication part;
notifying the device of the communication counterpart of performing the intermittent operation, the notification being made without receiving a response to the notification; and
outputting a cancel request of canceling the intermittent operation of the device of the communication counterpart when transmitting a data frame to the device of the communication counterpart and a response with respect to the data frame is not received from the communication counterpart.

6. A non-transitory computer readable medium including computer program instructions, which when executed by a communication apparatus, cause the communication apparatus to perform a method comprising:
performing a close-range one-to-one communication with a device of a communication counterpart by electric field coupling or magnetic field coupling;
performing intermittent operation without releasing connection after the connection is established with the device of the communication part;
notifying the device of the communication counterpart of performing the intermittent operation, the unit notifying without receiving a response to the notification; and
outputting a cancel request of canceling the intermittent operation of the device of the communication counterpart when transmitting a data frame to the device of the communication counterpart and a response with respect to the data frame is not received from the communication counterpart.

* * * * *